March 28, 1950 W. E. KING 2,501,680
ROTARY SWIVEL
Filed Oct. 12, 1946
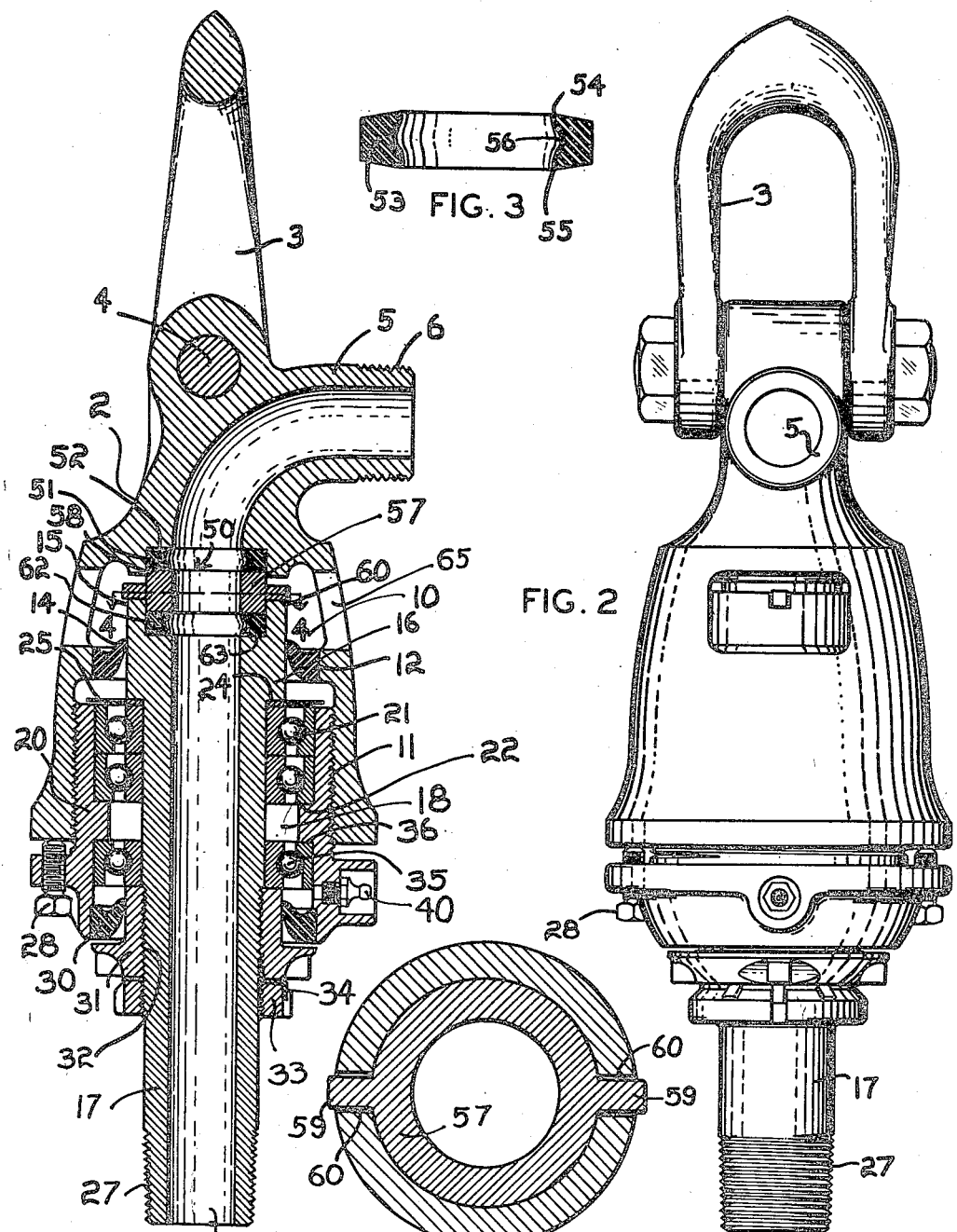
INVENTOR.
WALTER E KING
BY Lester B. Clark
+ Ray L. Smith
ATTORNEYS Patented Mar. 28, 1950

2,501,680

UNITED STATES PATENT OFFICE 2,501,680

ROTARY SWIVEL

Walter E. King, Houston, Tex.

Application October 12, 1946, Serial No. 703,071

10 Claims. (Cl. 285—97.3)

The invention relates to a rotary swivel, particularly of the type where a substantial weight is suspended in a rotatable position while a liquid is circulated therethrough.

Considerable difficulty is encountered in maintaining a seal between the rotating and the stationary parts of such a swivel and maintaining the bearings adjusted and sealed against foreign material.

It is therefore one of the objects of the invention to provide a seal for rotary swivels.

Another object of the invention is to provide a bearing assembly for the rotating stem in a rotary swivel where the bearing support may be adjusted to compensate for wear.

Still another object of the invention is to provide a complete sealing assembly between the rotating and the stationary parts of a rotary swivel.

A still further object of the invention is to provide a packing for rotary swivels which will maintain a seal between the stem and the swivel body.

Still another object of the invetnion is to provide an adjustment of the stem in a rotary swivel so as to compensate for wear on the packing which seals with such stem.

Still another object of the invention is to provide a packing for rotary swivels which can be readily replaced and renewed.

Still another object is to provide a rotary swivel wherein the packing and wearing surface adjacent the packing can be readily replaced.

A further object is to provide a rotary swivel which has a wear ring associated with the packing therein.

Other and further objects of the invention will be readily apparent when the following description is considered in connection with the accompanying drawings, wherein:

Fig. 1 is a vertical sectional view of a rotary swivel constructed in accordance with the invention.

Fig. 2 is a side elevation of the swivel taken at right angles to the section of Fig. 1.

Fig. 3 is an enlarged sectional view of one of the packings which maintains a seal between the stem and the swivel body.

Fig. 4 is a section taken on the line 4—4 of Fig. 1, illustrating the arrangement of the packing support or wear ring.

In Fig. 1 the swivel body 2 is in the form of a hollow-bell like member having the bail 3 pivoted thereon by the shaft 4. This body 2 has the usual laterally extending gooseneck 5 thereon which is threaded at 6 to receive the rotary hose by which drilling mud or other liquid is pumped through the swivel.

The body 2 is hollowed internally to form a chamber 10 which is threaded at 11 adjacent its lower end and is provided with a rib and shoulder 12 which is arranged to receive a lip type of seal ring 14. The lip of this ring faces upwardly and is arranged to bear against the periphery 15 of the head 16 of the stem 17. This lip ring prevents the entrance of any foreign material into the lower portion 18 of the chamber 10.

The portion 18 of the chamber 10 is arranged to receive a shell 20 which is engaged with the threads 11 and serves as a support for the upper anti-friction bearings 21 which are disposed on a shoulder 22 in such shell. The stem 17 has a shoulder 24 thereon which defines the head 16 and this shoulder is arranged to rest upon an annular shield 25 which is positioned on top of the anti-friction bearings 21. In this manner the weight of the stem and any drill pipe or other equipment which is suspended by the threads 27 thereon will be rotatably supported upon these bearings 21.

It seems obvious that by adjustment of the shell 20 in the threads 11, that the vertical position of the stem can be accurately determined. A set or locking screw 28 on the shell is arranged to engage the body 2 so as to lock or fix the shell relatively to the body.

The shell carries a lip packing 30 which is arranged to abut the periphery of a nut 31 which is threaded at 32 on the periphery of the stem. This nut may in turn be fixed in position with a lock nut 33 and a lock washer 34.

The nut 31 provides for adjustment and positioning of the lower upward thrust bearing 35 which abuts a shoulder 36 formed on the inside of the shell. By adjusting the nut 31 accurate positioning of the parts can in this manner be accomplished. This nut may in turn be fixed in position with a lock nut 33 and a lock washer 34.

The lower chamber portion 18 may be filled with a suitable lubricant through the fitting 40 so as to insure proper lubrication of the parts.

One of the essential improvements in the swivel is the packing assembly 50 comprising packing rings 53 and 62 and wear ring 57 which forms a seal between the top of the stem and the body 2. To provide for this packing assembly, the body 2 is recessed at 51 to provide a shoulder 52. This recess is arranged to receive a packing ring 53 which may be of any suitable resilient material and Fig. 3 illustrates such packing as having extended lips 54 and 55 at each side so that when the pressure is applied to the inner periphery 56, a seal will be formed along the upper and lower edges of the ring. It should be noted that in Fig. 3, the upper and lower edges are inclined so that the ring will be under compression when it is assembled and in use as seen in Fig. 1. In order to retain this packing ring 53 in position, a wear plate or retainer ring 57 is seen in Fig. 1. This ring has an upper surface 58 which bears against the lower edge of the packing ring 53 and it has the extension 59 on opposite sides thereof which are arranged to set in the grooves 60 which extend radially in the upper end of the stem. In this manner this ring 57 is compelled to rotate with the stem and the turning effect will be against the lower edge of the ring 53.

In order to form a seal between the stem and the wear ring 57, a lower packing 62 is positioned in a recess 63 also formed in the upper end of the wash pipe. The ring 62 is the same type of ring as the ring 53 and it seems obvious that with this construction, when the stem is adjusted vertically by means of the shell 20, that any desired compression can be placed upon the packings 53 and 62. In this manner by adjustment of the position of the stem, a seal may be maintained and adjustment had when wear occurs. Whenever substantial wear has occurred, it seems obvious that the shell 20 may be unscrewed sufficient to lower the stem and attain access to the ring 53 or the ring 62 or wear ring 57 for replacement, or a complete new assembly may be inserted if desired through the window 65 in the side of the housing 2.

The packings and the wear ring are annular and of substantially the same size as the passage 66 extending through the wash pipe and the gooseneck. The packing 62 is not subject to wear but may require replacement due to deterioration or chemical action. It seems obvious that the wear ring 57 may be reversed if desired.

Broadly the invention contemplates a simple and economical seal for a rotary swivel.

What is claimed is:

1. A hydraulic rotary swivel for well drilling operations to suspend the well pipe comprising a hollow body, a shell fitted into the lower end thereof, bearings supported in said shell, a rotatable stem extending through said shell, a shoulder thereon to ride on said bearings, a packing assembly between the end of said stem and body, and means to adjust said shell in said body so as to adjust the stem against said packing.

2. A hydraulic swivel for rotary well drilling comprising a hollow body, a shell fitted into the lower end thereof, bearings supported in said shell, a stem extending through said shell, a shoulder thereon to ride on said bearings, a packing assembly between the end of said stem and body, means to adjust said shell in said body so as to adjust said packing, a threaded end on said stem to support the load of the drill pipe on said bearings, a bail to support said body, and means to seal said stem in said body and in said shell.

3. A hydraulic swivel comprising a hollow body, a shell fitted into the lower end thereof, bearings supported in said shell, a stem extending through said shell, a shoulder thereon to ride on said bearings, a packing assembly between the end of said stem and body, and means to adjust said shell in said body so as to adjust said packing, said bearings including spaced upper and lower bearings, and additional means to adjust said lower bearing.

4. In a rotary drill pipe supporting swivel having a body with a stem therein, a flow passage in said body and stem, a seat in each said body and stem about said passage, a packing in each seat and in immediate contact with said passage, a wear bushing disposed between said packings and spanning the joint between said body and stem, and means to adjust the stem relative to said body to maintain a seal with said body, stem, and bushing.

5. In a swivel having a housing with a stem therein, a flow passage through said housing and stem, an assembly to seal between said stem and housing including a wear member to span the joint and form a section of said passage, and a packing ring at each end thereof to provide seals abutting said housing and stem respectively.

6. In a swivel having a housing with a stem therein, an assembly to seal between said stem and housing including a wear member, a packing ring at each side thereof abutting said housing and stem respectively, and interengaging means between said stem and said wear ring so that rotation of the pipe rotates the ring.

7. In a hydraulic swivel, a housing having an opening therein, a packing, a wear member for the packing to seal against, said packing and wear member being removable through the openings in the housing.

8. In a hydraulic swivel, a hollow body, a flow passage therethrough, a packing seat about said body passage, a packing in said seat, a rotatable wear member having a face for the packing to seal against, a stem rotatably mounted in said body, a packing seat in the top of said stem, a packing therein and a bearing against said wear member, means on said wear member and engaging said stem so that said member rotates with the stem, a shell adjustably disposed in said housing, bearings supporting said stem in said shell, means to clamp said stem to said bearings and shell, said wear member being axially adjustable by adjustment of said shell to compensate for wear on said packing.

9. In a hydraulic swivel having a hollow stem, a wear member, a packing on each side of the wear member, said wear member being axially adjustable with said stem with relation to one of the said packings and wing portions on said member engageable to rotate with said stem.

10. In a hydraulic swivel, a hollow body, a flow passage therethrough, a packing seat about said body passage, a packing in said seat, a rotatable wear member having a face for the packing to seal against, a stem rotatably mounted in said body, a packing seat in the top of said stem, a packing therein and a bearing against said wear member, means on said wear member and engaging said stem so that said member rotates with the stem, a shell adjustably disposed in said housing, bearings supporting said stem in said shell, means to clamp said stem to said bearings and shell, said wear member being axially adjustable by adjustment of said shell to compensate for wear on said packing, said packings and wear member being reversible.

WALTER E. KING.

REFERENCES CITED

The following references are of record in the file of this patent:

UNITED STATES PATENTS

| Number | Name | Date |
|---|---|---|
| 794,499 | Hageman | July 11, 1905 |
| 2,185,822 | Young | Jan. 2, 1940 |
| 2,378,329 | Rotter et al. | June 12, 1945 |
| 2,384,360 | Allen | Sept. 4, 1945 |
| 2,434,684 | Casperson | Jan. 20, 1948 |